Jan. 22, 1946. S. GORAD ET AL 2,393,462
COMBINED CHECK SORTING AND PHOTOGRAPHING APPARATUS
Filed July 20, 1940 3 Sheets-Sheet 2
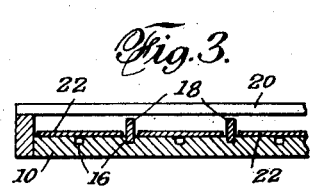
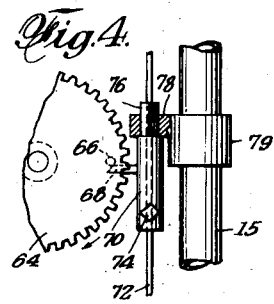
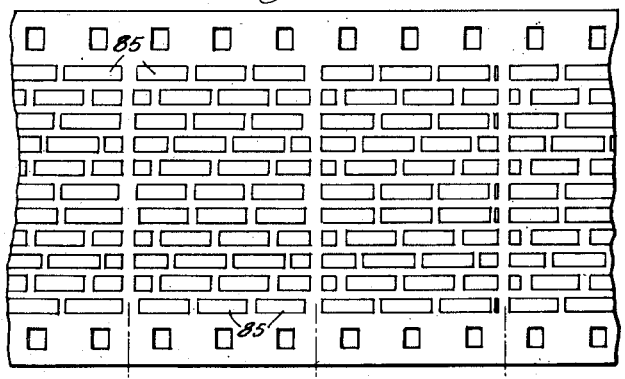
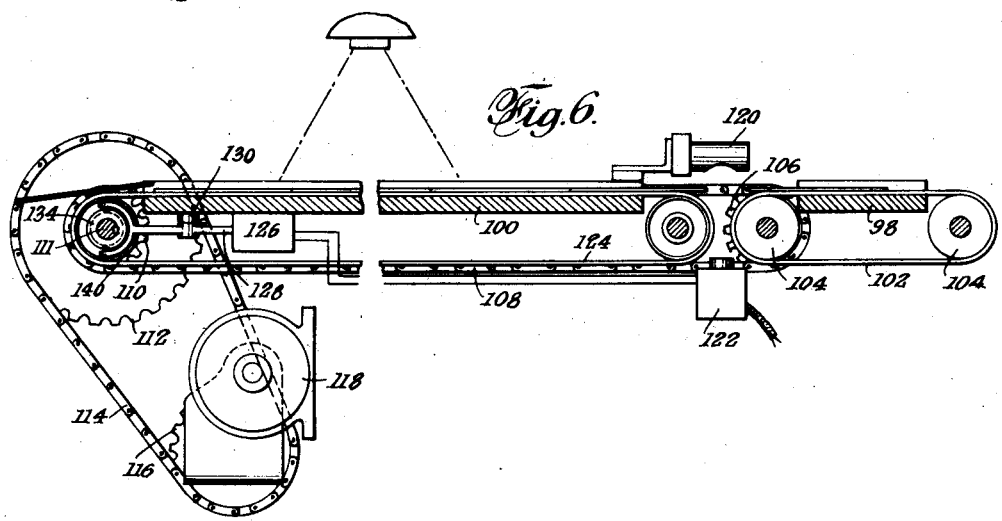
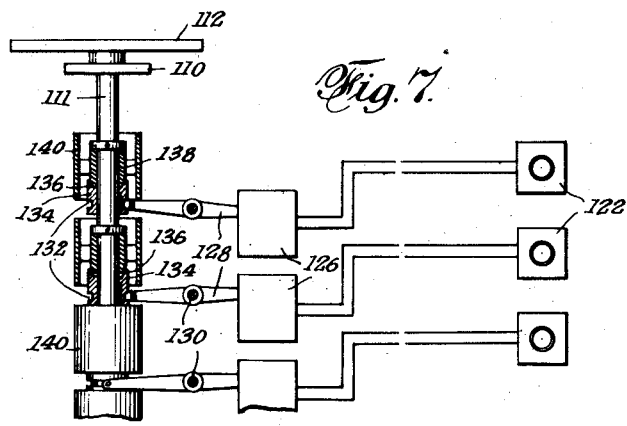
INVENTORS
SAMUEL GORAD
PHILIP F. JACOBS
BY
ATTORNEY

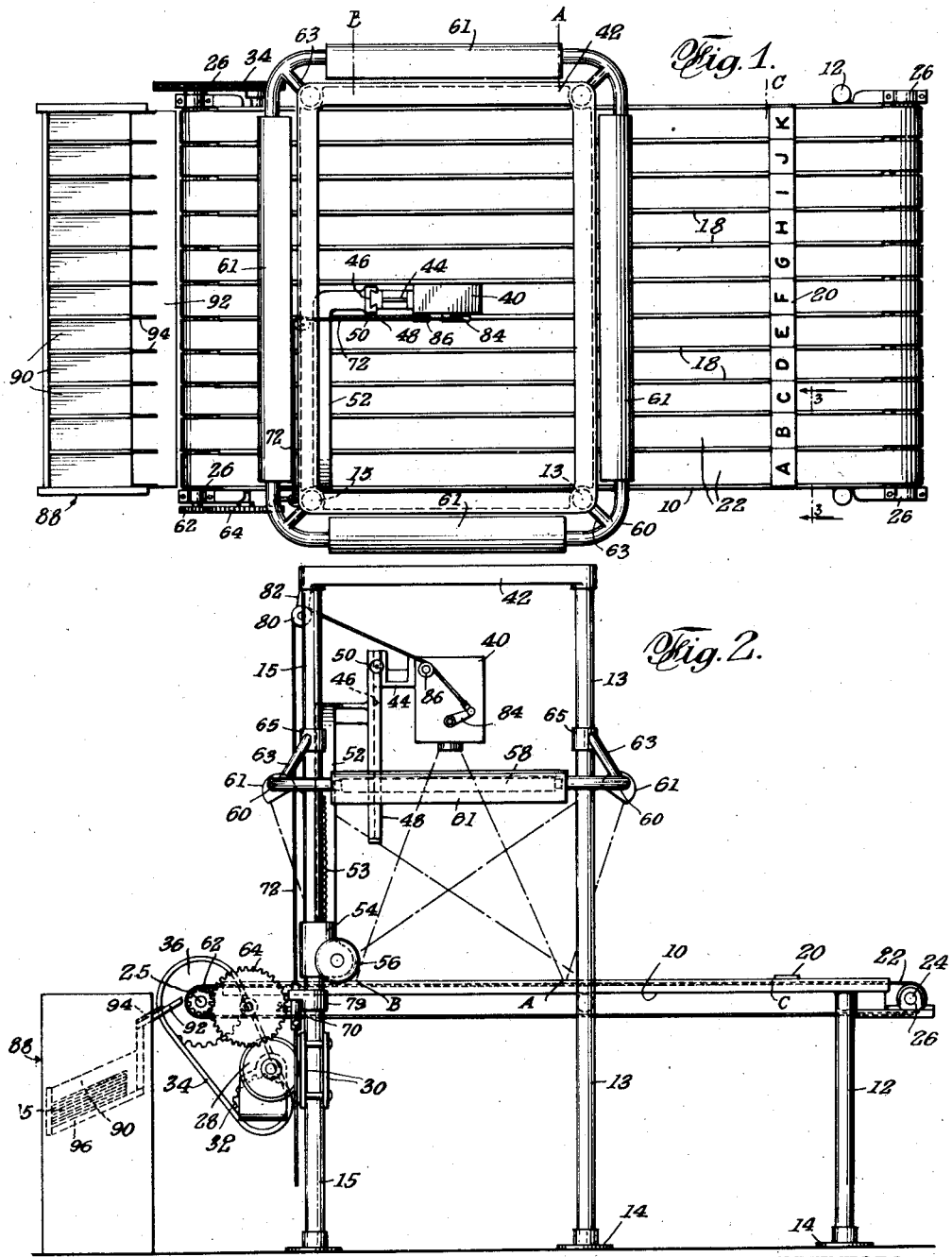

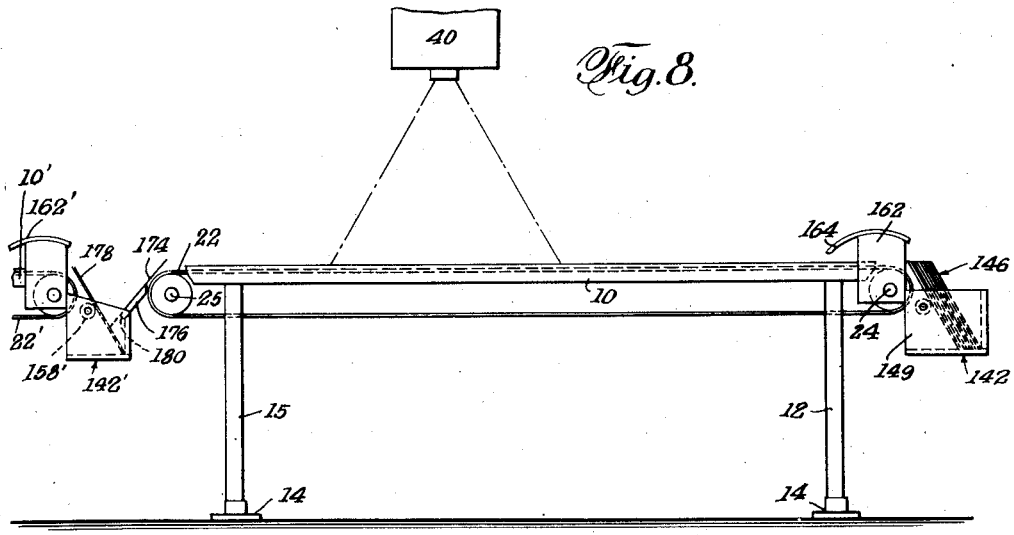
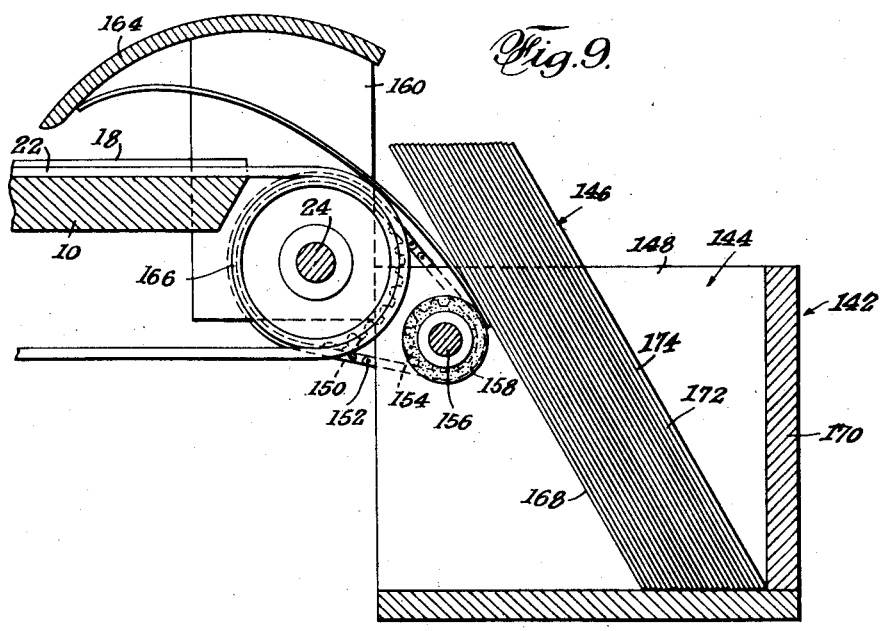

Patented Jan. 22, 1946

2,393,462

UNITED STATES PATENT OFFICE 2,393,462

COMBINED CHECK SORTING AND PHOTO-GRAPHING APPARATUS

Samuel Gorad and Philip F. Jacobs, New York, N. Y.

Application July 20, 1940, Serial No. 346,502

3 Claims. (Cl. 88—24)

The present invention relates to a combined sorting and photographing apparatus for records such as checks, documents, manuscripts and the like, in which the assorted records are moved into the field of the photographing camera to make a photographic record thereof, and then discharged from the apparatus in the relative arrangement into which they have been assorted.

Apparatus for photographing checks and the like has heretofore been used by banks to make permanent photographic records of all the checks which are handled by the bank. In commercial apparatus of this kind, only a single check at one time has been photographed on the film used. After the photographic record is made on the film, each check is discharged from the apparatus and must then be assorted in different groups or lots, depending upon the use to which the checks will be put. Apparatus of this kind heretofore used, therefore, is comparatively costly in both materials, labor and time.

The present invention contemplates the provision of an apparatus of the character described in which the sorting and photographing occur in one continuous operation. Since these two steps of assorting and photographing which, in the apparatus of the prior art, must be accomplished separately, are combined in the apparatus herewith concerned, there is a consequent speeding up of operations and, therefore, a greater volume of such records can be handled. Furthermore, less people are required for the operation of such apparatus.

The present invention further contemplates the provision of such an apparatus in which a great many documents can be handled at one time and in which a large number of such documents are photographed at each exposure on a single film with a consequent saving in the number of exposures required and, therefore, with resulting economy in both materials and labor.

The present invention further contemplates the provision of such an apparatus which is so arranged that the sorting and feeding operations can be accomplished with comparative rapidity and convenience. Furthermore, the present invention contemplates the provision of such an apparatus which is flexible and can be adjusted to handle different sizes of documents.

The present invention still further contemplates the provision of means for automatically feeding onto the apparatus, one at a time, in successive end to end arrangement and in selected assortment the documents to be photographed.

The present invention still further contemplates an apparatus of the character described in which a plurality of documents are automatically and successively fed onto the apparatus, then successively and continuously moved into the field of the camera where a photographic record is made of the decuments then in the camera field, then the documents moved successively and continuously out of the field of the camera and discharged from the apparatus into a receiving cabinet in the same selected assorted relationship, all of these operations being performed in a continuous series of successive operations.

The present invention still further contemplates the combination of such automatic document-feeding means with our photographic apparatus in such relationship that the documents are fed in selected assortment onto the apparatus in face-up position and thus photographed, then the documents discharged from the apparatus into a second similar automatic document-feeding means which is associated with a second photographic apparatus, the second feeding means feeding the documents onto the second photographic apparatus in face-down position to thereby arrange the reverse sides of the documents in position to be photographed by the second apparatus and the documents then discharged from the second photographic apparatus in assorted relationship, all the operations being performed in a continuous series of successive operations.

It is to be understood, of course, that while we have described this apparatus as being adapted to be employed with documents, it might also be employed with other articles of which a permanent record is desired to be made.

Other and further objects and advantages of the present invention will become apparent from the following description and the drawings relating thereto, in which Fig. 1 is a plan view of an embodiment of the present invention.

Fig. 2 is a side elevational view of the apparatus illustrated in Fig. 1.

Fig. 3 is an enlarged fragmentary view taken along the line 3—3 of Fig. 1.

Fig. 4 is an enlarged fragmentary view of the means for operating the camera shutter and film-advancing mechanism.

Fig. 5 is an enlarged view of a negative film showing the appearance of the photographed documents.

Fig. 6 is a side elevational view of a modification of the present invention.

Fig. 7 is an enlarged fragmentary view of the relay and associated mechanism for operating the endless belts of the modification shown in Fig. 6.

Fig. 8 is a side elevational view of two of our photographic apparatuses associated in series with one of our automatic document-feeding means arranged at each entrance of an apparatus, the illustration of the first apparatus being schematic and a fragmentary view of the second apparatus being shown.

Fig. 9 is a sectional view of our document-feeding means arranged at the end of a photographic apparatus table, only a fragmentary end of the table being shown.

Referring now to the embodiment of the present invention illustrated in Figs. 1 through 4, a substantially flat table 10 may be provided which may be arranged on suitable legs or supports 12, 13 and 15 to dispose the table at a convenient height.

The legs or supports may be made of any desirable shape or material, those illustrated being made of pipe screwed into foot plates 14 which latter in turn may be secured to the floor by means of nails, bolts or any other suitable means.

In order to divide the table into a series of separate longitudinal rows or lanes, a plurality of longitudinal slots 16 are arranged in the top of the table. A number of upstanding rails 18 are provided each of which is adapted to be arranged within a corresponding slot 16. The rails 18 may be arranged in adjacent slots, in alternate slots or in spaced slots to provide rows or racks, the widths of which may be selectively adjusted to accommodate different documents. A board 20 may be arranged transversely across the table and be marked with indicia to indicate the classification of the documents which are to be arranged in the corresponding row or rack. The table 10 serves as an assorting table and the documents may be assorted and placed in each row or rack in accordance with the indicia corresponding thereto. Thus, if the documents were, for example, checks, the rows or lanes would be arranged to receive checks of that bank on which those checks are drawn and, in operation, before the photographic record was made, the checks would accordingly be put in the row or rack corresponding to the proper bank.

In order for the checks to be moved along the table into the field of the camera in their assorted arrangement, we provide a number of endless belts 22, the number of endless belts equalling the number of rows or lanes provided on the table, the endless belts being separated by the rails 18. The endless belts 22 are operatively arranged on the shafts 24 and 25 provided at each end of the table. These shafts are journalled in suitable bearing brackets 26 on each side of the table. In the embodiment illustrated in the drawings, the documents are fed onto the apparatus at the right side thereof as viewed in Figs. 1 and 2, and the mechanism for driving the endless belts is arranged at the left side of the table.

For driving the endless belts, an electric motor 28 is provided, which may be clamped by means of suitable plates 30 to one of the legs 12 of the table. The motor 28 is arranged to drive a sprocket 32 which may be connected by means of a chain 34 to rotate a sprocket 36 mounted on the shaft 25. It will thus be seen that when the motor 28 is operated the sprocket 32 will drive the belt 34 turning the sprocket 36 and the roller 25 associated therewith.

It will be apparent that documents which are manually fed onto the table 10 in their assorted arrangement at the right side of the apparatus will be carried by the endless belts towards the left thereof, where, as will be described, the photographic record is to be made. At a selected position in their travel, these documents will be photographed and, therefore, we arrange a suitable camera, of conventional type, above the table at such position so that it will photograph all of the documents which come within its field when the shutter is snapped.

In order to secure the camera 40 in proper photographic relation to the table and the documents thereon that are to be recorded on the film, we prefer to extend the supports 13 and 15 upwards to a suitable height above the table. These extended supports 13 are held firmly in position against any undesirable relative movement by means of the rectangular frame 42 secured thereto at the upper ends of the supports which together therewith form a housing for the camera. The camera may be arranged in operative position centrally of the frame and extended supports.

The camera 40 preferably is the 35 mm. type of commercial camera using a continuous roll of film. We have found that by using a camera provided with 35 mm. film a great many more documents can be photographed at one time than is possible with the present commerical apparatus which employ cameras using smaller than 35 mm. film. In actual practice, with one of our apparata, we have photographed a total of 66 checks on a single frame of film. Of course, it will be understood that the lens used in the camera will be suitable to provide the required detail character.

The camera 40 may be secured by any suitable means to one side of the bracket 44, the other side of the bracket 44 having a portion thereof fitting into a keyway 46 in a vertically-arranged arm 48. A set screw having the knob 50 is arranged on the arm 48 to secure the bracket in position on the arm 48 and may be loosened to move the camera carrying bracket 44 in position thereon. The set screw may be loosened to permit the bracket and camera to be lowered on the arm so that access may be readily had to the camera when desired, for example, to load it with film, adjust the shutter or the like.

The exact construction of this mechanism and similar mechanisms being well known in the art, the details thereof will not be further described.

The vertical arm 48 may be formed integrally with or connected to a horizontally L-shaped member 52, which extends onto the vertically-disposed rack 53, arranged for reciprocation adjacent one of the extended supports 13.

In order to provide means for raising or lowering the camera 40 to aid in focusing it upon the documents arranged on the table, any suitable mechanism, such as a gear train arranged within the collar 54, to operatively engage the threaded portion of the rack, may be provided.

Such mechanism need not be illustrated in detail, since it will occur to anyone skilled in the art.

The collar 54 is secured to the support 15 and the rack 53 is arranged to reciprocate within the collar.

A knob 56 is rotatably journalled on the collar 54 and operatively engages the gear train so that upon corresponding rotation of the knob, the rack, and, therefore, the camera, are moved away from or toward the table. It will be apparent that by selectively arranging the position of the camera with respect to the table, the field of the camera, that is its size, may be adjusted as desired so that one or any greater number of rows or documents may be photographed, as desired.

In order to furnish the light necessary for the taking of the photographs, we prefer to arrange the light 58 at each side of the camera housing and below the camera and outside the field thereof, preferably placing such lights outside of the area bounded by the four supports 13 and 15 forming the camera housing. The lights may be carried by the rectangular frame 60, each side of which has arranged on it a light-encasing hood 61, which directs and concentrates the light rays toward and upon the documents to be photographed. We prefer to use fluorescent lights, though any other well known type of light may be used.

The frame 60 is secured at each corner thereof by an arm 63 to a collar 65 which is slidably arranged on the support adjacent thereto. The collars 65 are slidable on the supports to which they are so secured so that their position above the documents may be selectively adjusted for suitable lighting conditions.

In the modifications herein described, we prefer to have the tripping of the camera shutter accomplished automatically after the endless belt has moved a predetermined distance. For this purpose, we provide on the shaft 25 preferably adjacent gear 36 a small gear 62 which drives the larger gear 64 meshing therewith. The larger gear 64 has a stud 66 projecting therefrom at right angles to the side face thereof. There is arranged in the path of the stud 66 a finger 68 having the end thereof beveled. Upon rotation of the gear 64, the stud 66 will engage the finger 68 moving it down a selected distance. Upon continued rotation of the gear, the stud will be disengaged from the finger, the beveled end thereof enabling it to readily slide off the finger. The finger 68 is carried on and may be secured to or formed integrally with the collar 70. The collar 70 is arranged around the cord or wire 72 and may be secured thereto by means of a thumb screw 74 passing through said collar and frictionally engaging the wire 72. The thumb screw 74 may be loosened to permit the wire to pass freely through collar 70 when it is desired to change, for any reason, the relative position of the camera with respect to the table. The wire 72 is arranged, as will be described, to trip the camera shutter and move the film in the camera to successive frames or photographic positions.

The upper part of the collar 70 is provided with a squared key 76 which is arranged for movement in a corresponding square opening in the bracket member 78 extending from a collar 79 secured to or integral with one of the supports 15. Such arrangement will prevent rotation of the collar 70 and the wire 72 upon its operative motion.

The wire 72 is passed around a pulley 80 arranged on a bracket 82 extending from the top of one of the supports 15, the end of the wire 72 being connected to the arm 84 of the camera shutter tripping mechanism.

It will be apparent that the rotation of the gear wheel upon operative movement of the endless belts will, upon each rotation of the gear, cause the stud 56 to engage and move the finger 68 and collar 70 downwardly. Such movement will operatively actuate the tripping arm 84 to trip the shutter of the camera. Only a slight movement or pull on the wire 72 will be sufficient to trip the shutter and further movement thereof is used to move the film in the camera forward to the next picture frame for exposure. For this reason, we prefer to have the wire 72 cross over and frictionally engage the roller 86, which may be arranged on the conventional film feed mechanism found in the commercial camera and which roller 86, when turned, will, therefore, advance the film.

It will be recognized, that by reason of the fact that only a slight pull on the wire will trip the shutter, a photographic record of the documents will be made on the film before it is advanced by the further movement downwardly of the collar and wire.

The camera shutter mechanism may itself return the wire, collar and finger to their normal position after the stud disengages itself from the finger, or any other conventional means, such as making the wire or rope 72 flexible or arranging a compression spring between the collar 72 and the bracket in which it moves, may be provided. Such means will occur to anyone skilled in the art and need not be further described in detail.

It will be understood that the movement of the belts is made relatively slow so that the photographic record will not be blurred and that it will have the effect of a still picture.

The tripping mechanism is arranged to snap the shutter momentarily after the belts have been moved completely through the length of the camera field, which is from position A to B. When the belts are momentarily in the field of the camera and the shutter tripped, all of the documents, for example checks, arranged on the belts, will be recorded on a corresponding film frame A'—B'.

The length of belts from C to A will continue to move until it is entirely within the field of the camera, at which position the gear will have completed one revolution to bring the stud 66 into engagement with the finger 68 to snap the next film frame C'—A'.

It will be understood that after the exposure of the frame A'—B', the collar 70 and wire 72 are adjusted so that continued downward movement thereof will just advance the film frame C'—A' into the successive photographic position in the camera.

It will be understood that the ratio of gear 62 to gear 64 must be relatively fixed so that the belts will be moved an equal distance for each rotation of the gear 64. The ratio used in practice is dependent upon the photographic field and will vary with the number of rows and size of documents to be photographed.

It will be understood that the documents, for example checks 85, will not be fed uniformly on the belts in relative side by side alignment. Each picture frame will, therefore, not be a uniform record of the documents, which will be recorded thereon in a haphazard arrangement as illustrated in Fig. 5. At any event, any partial photograph found on any frame will match with the corresponding partial photograph record on the preceding or succeeding film frame.

It will at once be apparent that a relatively large number of documents, such as checks, can be photographed at one time at each exposure.

After the documents have been fed onto the table 10 in their assorted arrangement, they are moved into the camera field and photographed and continue to move to the left hand side of the table from which they are discharged into a receiving cabinet 88 having a plurality of compartments 90 equal in number to the number of lanes on the table 10. To maintain the documents as they are discharged from the endless belts in their relative arrangement, we prefer to provide a receiving board 92 adjacent the end of the table, the receiving board 92 slanting downward at an angle of substantially 45 degrees and having arranged thereon guide rails 94 equal in number to the number of rails on the table 10, the guide rails 94 being aligned with rails 18 forming a downward angle thereto. It is to be noted that the guide rails 94 do not run all the way up to the end of the receiving board 92 immediately adjacent the end of the table 10. It has been found in actual practice that by shortening the length of the guide rails 94 the documents, as they pass from the end of the table, will be caught by the top edge of the guide rails 94 not at the end of the said documents but more toward the middle, and, therefore, more toward the position which is likely to be in proper alignment on the endless belt. If these guide rails 94 are extended so as to be immediately adjacent the table, it has been found that they tend to catch the edges of the documents as they are discharged off the end of the table and to throw them into disarrangement in the cabinet. It has also been found that the bottom 96 of the compartment 92 if also slanted downward will help to maintain the documents in their assorted arrangement.

Referring now to Figs. 6 and 7, a different embodiment of the present invention is there illustrated wherein the documents will be assorted in the camera field in a uniformly aligned arrangement. In this embodiment, two tables 98 and 100 are provided, table 98 being smaller than the other table. Both tables are provided with rails to form on each a plurality of corresponding lanes, such as those illustrated in Fig. 1. Each such lane is adapted to receive one document at a time. The documents are fed onto the receiving table 98 and are moved thereon toward the table 100 by means of an endless belt 102 arranged around the rollers 104 provided at each end of table 98. One of the rollers 104 is provided with a sprocket 106 which may be driven by means of the chain 108, which latter is in turn connected with the driving gear 110. This driving gear 110 is secured to the shaft 111 to which the larger sprocket 112 is also secured. The sprocket 112 is driven by the chain 114 and sprocket 116 which itself is driven by the electric motor 118. It will be apparent that when the apparatus is in operation and the motor 118 is running, the belt 102 will be in continual motion. Thus, if any document is deposited on table 98, it is immediately moved along that table to the end thereof.

The document-advancing table 100 is provided with an endless belt in each separate row, similar to table 10 of Fig. 1. The means for selectively operating these belts will now be described.

Between the document-advancing table and the document-receiving table and above them, we arrange adjacent each row an exciter lamp 120, which directs light rays upon a corresponding conventional photo-electric cell 122.

It will be apparent that as a document is transferred from the document-receiving table 98 to the document-advancing table 100, it must pass between the lamp and cell and, therefore, intercept the beam of light emitted from the lamp. The interception of the beam of light between the exciter lamp 120 and the photo-electric cell 122 is arranged to actuate a conventional relay to cause the endless belt 124 on table 100 adjacent the corresponding lamp and all the documents to move toward the camera, as will be hereinafter described. This belt will continue to move so long as the beam of light is intercepted by a lamp and the cell. Upon a document being passed by the lamp, the beam of light will again be directed on the cell to thereby cause the relay to resume its original position and stop forward movement of the endless belt.

The mechanism for accomplishing this operation is diagrammatically illustrated in Fig. 7. Referring to that figure, the wires from the photo-electric cell 122 are connected to a conventional relay mechanism 126 which actuates the arm 128 arranged on the pivot 130, the end of the lever 128 opposite the end within the relay being arranged within a channel 132 in the clutch member 134. The clutch member 134 fits about the shaft 111, to which it is keyed so that it will rotate with it, as heretofore described, the shaft 111 continually rotates so long as the motor 118 is operated. The clutch member 134 is keyed to the shaft in a conventional manner so that it is adapted to slide on the shaft into frictional engagement with the sleeve 138. The friction sleeve 138 fits loosely around the shaft 111 and, therefore, normally does not rotate therewith. In order to cause rotation of the sleeve 138, the inwardly tapered friction face 136 thereof is moved into engagement with the correspondingly tapered friction cone 137 of the sleeve and held thereagainst by the relay actuated arm 128. Secured to or integral with the sleeve 138 is the driving drum 140 about which the endless belt 124 is arranged so that upon rotation of the drum the endless belt 124 will move therewith.

From the foregoing description, it will, therefore, be seen that when a document is placed on the table 98 on the continually moving belt 102, the document will be moved forward until it breaks the beam of light between the exciter lamp 120 and the photo-electric cell 122. The photo-electric cell 122 thereupon acts within the relay 126 in a manner well known in the art and which, therefore, will not be described, to move the lever 128 so that the clutch member 134 engages the sleeve 138 and thereby rotates the drum 140 to move the endless belt 124. The endless belt 124 will continue to move until the document has passed the point at which it intercepts the beam, whereupon the beam will be restored and the photo-electric cell will then react upon the relay so as to cause the arm 128 to return to its original position so as to disengage the clutch member 134 from the sleeve 138, thereby causing the drum 140 to cease turning and the belt 124 to cease advancing. The placing of another document upon endless belt 102 will repeat the same operation and the document originally placed thereon will be advanced further ahead.

It is, of course, understood that there are as many endless belts 124 as there are to be rows, each lane having its own photo-electric cell and exciter lamp as well as relay and clutch mechanism. It will be apparent that with such mechanism the documents in each row will be relatively aligned when they reach the field of the camera.

If desired, automatic means for successively and continuously feeding in selected assortment the documents onto our photographic apparatus may be provided to thereby eliminate manually feeding the documents singly into each row or lane.

Where manual feeding of the documents onto one of our apparata provided with a large number of rows or lanes is performed, a comparatively large number of persons will be required, since only a relatively small number of such rows or lanes can be attended by one person. In addition, in such event space requirements may restrict the size of the apparatus, that is the number of rows or lanes may thereby be limited by the number of operators who, within the space allotted, can be accommodated at the document entrance to the apparatus.

We have, therefore, provided means for arranging the documents in assorted bundles or piles, from which they are automatically, continuously and successively fed onto the apparatus from each bundle or pile in the selected assortment or bundle or pile arrangement, thereby reducing to one the number of operators required to operate the apparatus and increasing the working size and rapidity of operation thereof.

Referring now particularly to Figs. 8 and 9, if desired, the document-feeding cabinet 142 from which the documents to be photographed are fed onto the apparatus may be arranged at the entrance to our photographic apparatus at the forward end of the assorting table 10. We have not shown the photographic apparatus in Fig. 8 in detail, it being understood that the same apparatus illustrated in Figs. 1, 2, 3, and 4 and just described in reference thereto is to be used in the modification of our invention which we will now describe, it being useless repetition to again illustrate and describe the same details of construction. It will be understood that our document-feeding means will have application to other suitable photographic apparatus of different construction.

The document-feeding cabinet 142 is provided with a plurality of compartments 144, each one of such compartments corresponding to and being in alignment with a row or lane formed by the spaced rails 18 on the table 10 and each compartment having arranged thereon a bundle or pile of documents 146. Therefore, as will be apparent from our further description, a single check 85 will be fed from the pile or bundle 146 in a compartment 144 of the cabinet 142 onto the endless belt 22 of a corresponding row or lane.

To operate the apparatus, the operator assorts the documents, being checks in the illustration concerned with herein, in piles or bundles corresponding to the classification selected and arranges a pile or bundle 146 in each compartment 144 of the cabinet 142. The bundles 146 of checks are arranged therein on their ends between the parallel walls 148 which separate each compartment. Such walls correspond to and are in alignment with the rails 18 which form the row or lane into which the checks from each bundle or pile are to be fed.

In order to operate the document-feeding means concurrently with the photographic apparatus, we provide a driving sprocket 150 which is secured to the shaft 24 and is operatively connected by means of the chain 152 to rotate the driven sprocket 154 which is mounted on the shaft 156.

It will be apparent that the shaft 24 will be rotated by the operation of the endless belts under the action of an electric motor 28 (see Fig. 1), to thereby cause corresponding rotation of the shaft 156.

The shaft 156 is journalled in the end walls 148 of the cabinet 142 adjacent the exit 157 thereof in any well known suitable manner and extends thereacross.

The shaft 156 is provided with frictional document-engaging means, preferably a rubber roller 158, which rubber roller extends across each of the compartments between the walls 144 which form them.

The size of each compartment in relation to the position of the shaft 156 is such that the pile of checks gravitate forward at an angle so that they rest against the friction roller 158.

As heretofore described, the shaft 24 is continuously rotated when the photographic apparatus is in operation while the belts 22 in the rows or lanes are continuously moved. Similarly, so long as the machine is in operation, the shaft 156 and friction roller 158 are continuously rotated.

It will be apparent that the first check 85 of the pile or bundle 146, as it rests upon the friction roller 158, which rotates when the machine is operated, will be picked up by it from the pile or bundle and carried upwardly from the compartment 144. In order to guide the document, which is thus raised from the pile, onto the row or lane corresponding to that compartment, we provide for each compartment, adjacent the exit 157 of the cabinet and the entrance to the corresponding lane or row, a document-guiding channel formed by the walls 160 and 162 which are in alignment respectively with the walls 148 and 149 of the compartment and preferably secured thereto. It will be at once apparent that as the document 85 is fed upwardly from the pile, it must pass through the continuous passage thus formed by the walls 148 and 149 which are also in alignment with the walls 160 and 162 and the rails 18 forming the row or lane corresponding to the compartment. The check, which has sufficient inherent rigidity, will be carried upwardly until the leading edge 164 thereof strikes the roof or shoe 166 arranged over the guiding channel preferably integral with the walls 160 and 162.

As the document 85 is moved further by the friction roller 158, it will under the influence of the preferably curved roof or shoe 166 be directed onto the moving belt 22, the walls of the compartment and of the guiding channel cooperating with rails to prevent lateral displacement of the check as it is fed onto a belt 22.

We have found that in practice the friction roller 158 should be rotated preferably faster than the belt roller 168 so that the document 85 will be quickly picked up and rapidly moved into the channel against the shoe or roof 166. In actual practice, we have found that a ratio of four to one for sprocket 150 and sprocket 154 is very satisfactory for the conventional size check.

It will be apparent that when the leading check 85 is raised upwardly, it will be carried forward by the endless belt 22 upon its being moved beyond the influence of the friction roller 158. When the check 85 leaves the friction roller, it is carried forward in the row or lane by the endless belt, when the next succeeding check 168 in the pile 146 gravitates against and is frictionally engaged by the friction roller 158 and moved upwardly between the walls 160 and 162 of the channel until it likewise is disposed on the endless belt 22, each succeeding check automatically successively and continuously following the same operation until the entire pile or bundle in the compartment is depleted.

It will be understood that the distance of the shaft 156 below the endless belt 22 will be such that there will not be an overlap of the succeeding check 168 on the preceding check 85, but that it will fall on the endless belt an extremely small distance behind the preceding check 85. It will be also understood that the speed of rotation of the friction roller 158 may also be varied with respect to the speed of movement of the endless belt 22 in relation to the relative spacing of these parts to provide such results.

It will be understood that the distance of the shaft 156 from the rear wall 170 of the document-containing cabinet will be such as to dispose the pile of documents against the friction roller 156 at an angle of sufficient magnitude to enable the leading check of the pile to be operatively grasped thereby and that the distance of roof or shoe 164 above the corresponding row or lane will depend on the size and type of document being photographed. It will be further understood that for documents of practically little or no inherent rigidity the roof or shoe may be dispensed with.

In order to insure that the last check 172 will operatively fall and be held against the friction roller 158, we prefer to arrange against the last check of each pile a blank sheet such as the cardboard sheet 174. Such cardboard sheet will urge the last check of the pile 146 onto the rubber roller to insure that it will be grasped thereby and fed onto the belt 22 in the lane or row corresponding to the compartment 144.

As has been pointed out before, it will be understood that the cabinet 142 is provided with a plurality of compartments, each one of which is adjacent to and aligned with a corresponding row or lane on the table 10. It will, therefore, be apparent that before the apparatus is put in operation, a pile of documents, for example checks, will be arranged in each compartment to correspond to the row or rack in accordance with the indicia on the bar 20 (see Fig. 1).

It will now be apparent that the checks from each pile are fed one at a time onto the corresponding row or lane in end to end successive arrangement in the selected relative arrangement or assortment. It will further be apparent that the documents or checks will be fed into each row or lane in uniform relative alignment as distinguished from the haphazard relative alignment illustrated in Fig. 5.

The next operations, after the checks are thus automatically fed onto the endless belts, will be exactly the same as those described hereinbefore with reference to the apparatus of Figs. 1, 2, 3 and 4.

A check from each compartment will be simultaneously fed onto an endless belt 22 in the row or lane corresponding to the compartment and the checks thus fed onto the table 10 will be carried in their assorted arrangement to the field of the camera 40.

When a selected portion of the documents are in the field of the camera, the camera is snapped, a photographic record of the checks made and the film advanced to the next frame, all as heretofore described (Figs. 1, 2, 3 and 4).

The checks will continue to be moved past the camera to the end of the table 10 where they may be discharged into a receiving cabinet 88 (see Fig. 1 and Fig. 2) in their relative assorted arrangement.

It will be apparent that our apparatus has photographed only one face of each check or document. Where it is desired to make a record of the reverse or back face of each check or document in a continuous successive series of operations, we arrange a second document-feeding cabinet and associated apparatus in series with the first cabinet and apparatus (see Fig. 8) which we will now describe.

In describing the second-mentioned cabinet and apparatus, we will use like reference characters for like parts, except that those reference characters relating to the second cabinet and apparatus will be "prime numerals."

Referring now to Fig. 8, we provide a second photographic apparatus having a second table 10' which may be arranged in series with the first table 10. Such apparatus is not illustrated, since it will be in all respects similar to that heretofore described with reference to Figs. 1, 2, 3 and 4 to which reference should be made. It will be understood that the documents fed thereon will be moved in their assorted arrangement in rows or lanes to within the field of the camera 40 thereon and discharged therefrom into a cabinet 88.

The table 10' is likewise provided with a document-feeding cabinet 142' having compartments each corresponding to and in alignment with a row or lane provided on the table 10', the number of rows or lanes on table 10' corresponding to the number of rows or lanes on table 10.

The cabinet 142' is provided with the document-feeding means 158' heretofore described (see Fig. 9).

Each compartment of the cabinet 142' is likewise aligned with a corresponding row or lane on the table 10 so that as a document is discharged therefrom it will be received into a compartment there to be fed onto a corresponding lane in the table 10' of the second apparatus.

To maintain the documents as they are discharged from the endless belts of table 10 in their relative arrangement, we prefer to provide a receiving board 176 adjacent the discharge end of the table 10, the receiving board 176 slanting downwardly at an angle of substantially forty-five degrees and having arranged thereon guide rails equal in number to the number of guide rails 18 on the table 10, the guide rails being aligned with the rails and forming a downward angle thereto.

Such guide rails are not shown in detail since they will be similar in construction to the guide rails 94 of the receiving board 92 of the cabinet 88 illustrated in Figs. 1 and 2.

At the commencement of operation of the apparatus, in order to insure that the checks, as they are received from the table 10 are operatively disposed against the friction rollers of the document-feeding means 158', one or two blank sheets 178 are arranged in each compartment of the cabinet 142' against the document-feeding means 158'. As a check is discharged from the table 10 onto the receiving board 174, it will slide downwardly against the blanks 176 and will gravitate into the respective compartments and lie against the blanks 176 in proper angular relationship to the document-feeding means 158'.

We prefer to arrange the end 180 of the receiving board 174 slightly in advance of the rear edge of the blanks 176 so that any check as it is discharged from the receiving board will strike the pile of checks in the cabinet 142' in such manner as to cause it to fall over in proper angular position against the blanks 176 or a check previously discharged therein.

It will be apparent that the checks in the cabinet 142' will be fed, in the manner heretofore described with respect to cabinet 142 (see Fig. 9), onto the table 10' of the second apparatus with the reverse face thereof upward in position to be photographed as heretofore described with respect to Figs. 1, 2, 3 and 4. It will be further apparent that in this way we have provided a photographic apparatus which will automatically feed the assorted checks in their assorted arrangement into a photographic apparatus, move such checks into the field of the camera where photographic records thereof are made, move the checks which have been photographed out of the field of the camera into a cabinet in their assorted arrangement in such position that they will be fed from that cabinet onto a second apparatus with the reverse faces of the checks in position to be photographed, then moved into the field of a second camera where the reverse sides of the checks will be photographed, then moved from the field of the second camera and discharged from the apparatus into a receiving cabinet in their assorted arrangement, all of these operations being automatic and continuous.

While the specific details have been herein shown and described, the invention is not confined thereto as changes and alterations may be made without departing from the spirit thereof as defined in the appended claims.

We claim:

1. A document sorting and photographing apparatus comprising, in combination, a table, a plurality of movable endless belts arranged on said table, each adapted to receive documents to be photographed, a plurality of guide rails arranged between the endless belts forming lanes for receiving different classes of said documents, mechanism for moving the endless belts, a camera arranged above said table so as to include the width of the table and a substantial portion of its length within the camera field, said documents received in said lanes being advanced on the table by the endless belts to the field of said camera, a lever on said camera for tripping the shutter thereof to expose a film and make a photographic record of the documents advanced to the field of the camera, a roller on said camera for advancing the film therein, a rotating member arranged adjacent the table, said rotating member being connected with, and adapted to be rotated by the mechanism for moving the endless belts, a stud projecting from said rotating member and movable therewith, a finger having a beveled end arranged in the path of movement of the stud and adapted to be moved thereby, a wire having one end thereof secured to the shutter of the camera and passing around and frictionally engaging the film advancing roller of the camera, said wire being secured to the finger and moving therewith, movement of said wire serving to trip the shutter and move the film-advancing roller to advance the film in the camera into position for a succeeding exposure.

2. A document sorting and photographing apparatus comprising in combination a table, a plurality of endless belts arranged on said table, each adapted to receive documents to be photographed, a plurality of guide rails arranged between the endless belts to form lanes for receiving different classes of said documents, mechanism for moving the endless belts, a camera arranged above said table so as to include the width of the table and a substantial portion of its length within the camera field, said endless belts being adapted to move the documents to within the field of the camera, means, associated with the mechanism for moving the endless belts, for operating the camera and advancing the film therein, a cabinet arranged adjacent an end of the table and adapted to receive documents upon their discharge off the end of the table by movement of the endless belts, said cabinet being divided into a plurality of compartments equal in number to the number of lanes, a compartment being in alignment with a lane, and a receiving member intermediate the end of the table and the cabinet, said member having rails thereon aligned with the rails on the table, said receiving member slanting downward at an angle to the table, said rails beginning at a substantial distance from the end of the receiving member adjacent the table.

3. A document sorting and photographing apparatus comprising, in combination, a table, a plurality of endless belts arranged on said table and adapted to receive thereon documents to be photographed, a plurality of spaced guide rails arranged between the endless belts to form lanes for receiving different classes of said documents, mechanism for moving the endless belts, a camera arranged above said table, a lever on said camera for tripping the shutter thereof to expose a film, a roller on said camera for advancing the film therein, a rotating member arranged adjacent the table, said rotating member being connected with and adapted to be rotated by the mechanism for moving the endless belts, a stud projecting from said rotating member, a finger having a beveled end arranged in the path of the stud, said finger being adapted to be moved a selected distance by the stud, said stud sliding past the beveled edge of the finger after the finger has been moved the selected distance, a collar having the aforesaid finger arranged thereon, a flexible wire having one end thereof secured to the shutter-actuating lever of the camera and passing around and frictionally engaging the film-advancing roller of the camera, said wire passing through said collar, a bolt on said collar adapted to be tightened to secure the wire to the collar so that the wire moves therewith, a squared guide secured to the wire, a member secured to the table and having a squared opening therein through which said guide passes.

SAMUEL GORAD.
PHILIP F. JACOBS.